Sept. 27, 1966   J. D. LAYTON   3,275,342
MECHANISM FOR ATTACHING TRAILING AND LEAD VEHICLES
Filed June 15, 1964
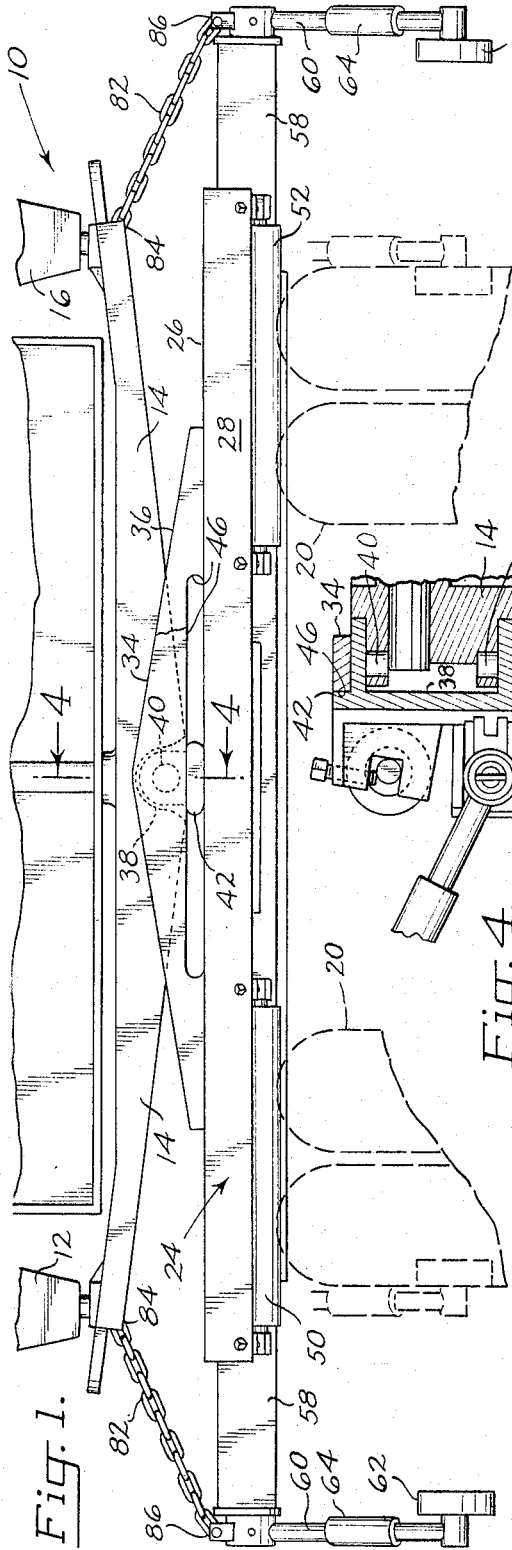
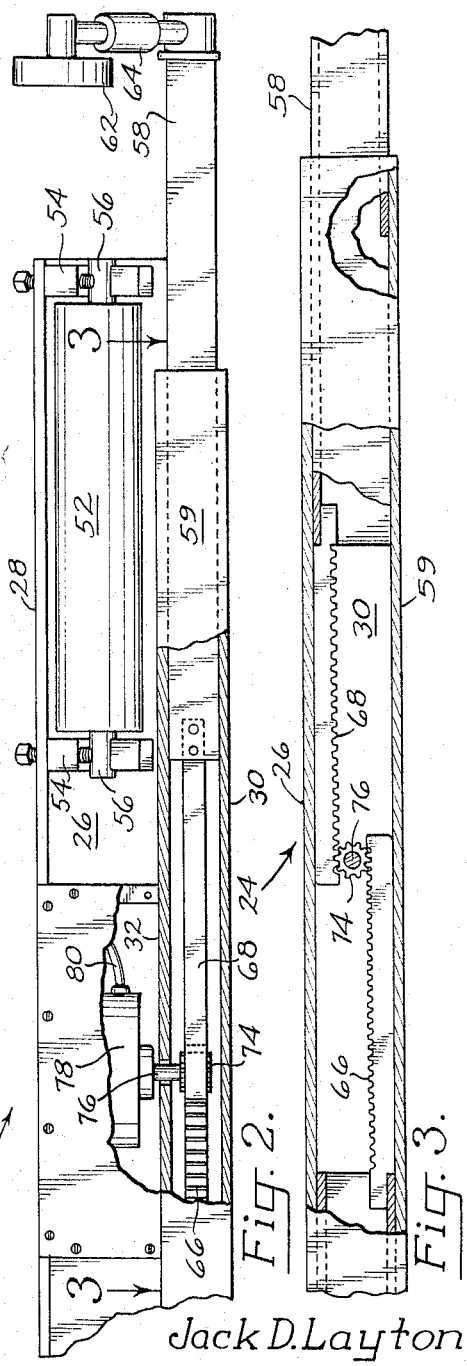
Jack D. Layton
INVENTOR.
BY
Ramsey, Kolisch & Hartwell
Attys.

United States Patent Office 3,275,342
Patented Sept. 27, 1966

3,275,342
MECHANISM FOR ATTACHING TRAILING
AND LEAD VEHICLES
Jack D. Layton, Salem, Oreg., assignor to Layton Manufacturing Co., Salem, Oreg., a corporation of Oregon
Filed June 15, 1964, Ser. No. 374,899
9 Claims. (Cl. 280—460)

This invention relates to mechanism for attaching two vehicles together, whereby movement of one vehicle contorls movement of the other.

The invention has particular utility in connecting together vehicles such as a paver with a dump truck, where it is desired that the paver closely follow the dump truck during actual paving of an area, and be readily detachable from the dump truck after the latter has dumped its load to enable a full truck to be substituted therefor. While a paver has been mentioned specifically, it is not intended thereby to exclude other uses of the invention, as it may also be used to connect trailing vehicles such as a windrower or a road widener to a lead truck, and may be employed in fields other than road construction where similar operating problems are encountered.

Further explaining a specific embodiment of the invention, apparatus commonly employed to pave a road surface comprises a paving machine or paver, which includes a hopper into which aggregate is dumped, and a screed or other leveling means which trails the hopper and functions to smooth and compact the material flowing from the hopper. Large paving machines frequently are self-propelled, and travel at relatively slow speeds during actual laying of pavement. By way of example, such self-propelled machines may travel at speeds ranging from 50 to 120 feet per minute. When paving an area, a dump truck initially full of aggregate is connected to the forward end of the paver, and the truck and paver move forwardly together as the contents of the truck is dumped over a period of time into the hopper of the paver. With a self-propelled paver, the paver may be employed to push the truck ahead while laying pavement, since the speeds involved are so slow as to make it impractical to move the truck through its own power plant, and thus the connection between truck and paver should accommodate such pushing by the paver. The apparatus of the invention may be employed to couple a truck and trailing vehicle such as a paver together under the conditions outlined, in a highly practical and satisfactory manner.

Generally, therefore, an object of this invention is to provide improved means for coupling together lead and trailing vehicles.

More specifically, an object is to provide novel means for connecting together lead and trailing vehicles, which produces a connection between vehicles whereby movement of one vehicle controls movement of the other, and which is easily manipulated to enable separation of the vehicles.

An important feature and object of this invention is to provide means for so connecting two vehicles together, which is effective to couple them closely together, and at the same time afford some relative movement between the vehicles, such as would be necessary to enable the vehicles to pass over uneven ground, around turns, etc.

When distributing with a machine aggregate dumped from a dump truck, obviously frequent changes in the dump truck connected to the machine employed will be made during any working day. Hook up of a new truck with a paver or similar machine is facilitated if parts connected to the paver are properly centered and aligned with respect to the paver, prior to movement of the truck into position for attachment, as this permits maximum ease in backing the truck into such position. According to this invention, an object is to provide means for coupling two vehicles which may be actuated so that automatically upon disconnecting one vehicle from another, parts producing connection between vehicles open up and position themselves so as to most easily allow another vehicle to be substituted for one of the pair just disconnected.

In general, the apparatus contemplated comprises an elongated beam which is mounted on the trailing vehicle, i.e., the paver, in such a manner as to be pivotable about a substantially vertical axis, and also shiftable laterally of the trailing vehicle. Oppositely disposed arms which attach to the rims of rear wheels in the lead vehicle are mounted on opposite ends of the beam, and these arms are extensible and contractible relative to the beam. Novel power-operated means is provided for producing such extension and contraction of the arms. Interposed between the arms and the frame of the trailing vehicle is linking means which limits the play afforded the arms with respect to the frame of the trailing vehicle. The beam itself has antifriction means thereon which engage the rear wheels of the lead vehicle whereby the trailing vehicle may push the lead vehicle.

On extending the arms, the rims of the lead vehicle are automatically released, to enable separation of the lead vehicle from the trailing vehicle. On complete and full extension of the arms the beam becomes centered and positioned normal to the longitudinal axis of the trailing vehicle. The parts then are in a position whereby a new lead vehicle or truck is most easily backed against the transverse beam and between the arms prior to attachment by contraction of the arms.

Various other novel features and objects of the invention will become apparent as the following description is read in conjunction with the accompanying drawings, wherein:

FIG. 1 is a plan view of apparatus constructed according to an embodiment of this invention, showing in dashed outline the rear wheels of a dump truck, and behind these wheels a transverse equalizing beam connected to a trailing vehicle, which has mounted thereon opposed arms used in attaching the trailing vehicle to the wheels of the dump truck;

FIG. 2 is a front elevation, on a slightly enlarged scale, showing portions of the equalizing beam and the mounting for one of the arms therein, with parts broken away;

FIG. 3 is a cross sectional view, taken generally along the line 3—3 in FIG. 2; and FIG. 4 is a cross sectional view, taken generally along the line 4—4 in FIG. 1.

Referring now to the drawings, at 10 there is indicated generally portions of a paver, such as may be employed to receive aggregate cascading from a dump truck and to spread and smooth this aggregate over an area being paved. The paver is not shown in detail, since the machine may be of conventional construction, and specific details thereof form no part of this invention. For the purpose of this disclosure, suffice it to say that the paver or paving machine includes a hopper which is positioned beneath the rear end of a dump truck's dump body with the paver in operative position behind a truck. The paver may also include tracks or wheels which are driven under power, whereby the same is supported on the ground and self-propelled. The hopper in the paver has an opening through which aggregate pours into the surface to be paved, and behind this opening is a screed or other leveling device which operates to level and compress the material.

Paver 10 includes the usual frame, portions of which are shown at 12, 14, and 16. In the paver these are all integrally joined together. In FIG. 1 rear wheel assemblies of a conventional type of dump truck are illustrated in dashed outline at 20. As is conventional, each wheel assembly comprises dual wheels, each comprising a tire casing mounted on a rim. The wheel assemblies are mounted on the rear axle of the dump truck.

Considering now details of the structure contemplated for coupling together the paver or trailing vehicle, with the dump truck or lead vehicle, at 24 is indicated an elongated arm mounting, also referred to herein as an equalizing beam, which is disposed forwardly of the paver and extends transversely thereof. In the embodiment of the invention illustrated, the beam may comprise an elongated back plate 26, and joined to the upper margin thereof an elongated flange 28 which projects forwardly of the back plate. Also projecting forwardly of the back plate, and substantially paralleling flange 28, are flange 30, joined to the back plate adjacent the bottom margin thereof, and flange 32 joined to the back plate between the top and bottom flanges.

Beam 24 is mounted on the frame of the trailing vehicle, i.e., the paver, by means accommodating pivoting of the beam about a substantially vertical axis, and also shifting of the beam laterally of the trailing vehicle or longitudinally of its own length. More specifically, joined to the back side of back plate 26, and projecting rearwardly therefrom, is an upper ledge 34 and a lower ledge 36. The two ledges have similar shapes, viewing them in plan, and are in vertical alignment. The lower ledge extends under frame portion 14 of the paver, and upper ledge 34 extends over this frame portion.

Pivotally mounted on frame portion 14 is a pivoted yoke 38. The pivot connection between the yoke and the frame portion is established by pins 40 joined to the yoke. The yoke has an upward projection 42 extending out from the top thereof, and a lower projection 44 extending out from its base.

The upper and lower ledges are each provided with an elongated slot 46, which extends longitudinally of the ledge adjacent where the same joins back plate 26 of beam 24. These slots receive projections 42, 44 of yoke 38. By the inclusion of the slot, sliding movement of the beam relative to the yoke is afforded, with the beam moving laterally of the trailing vehicle, or longitudinally of itself. The beam at the same time is relatively pivotable with respect to frame portion 14 by the pivot connection provided by yoke 38.

In the construction the beam is utilized to impart a thrust to the lead vehicle, i.e., the dump truck, by pushing on the rear wheels thereof. The beam is also utilized to prevent separation of the trailing and lead vehicles through means that engage the rims of the rear wheels of the lead vehicle. This form of interconnection of the vehicles is established while retaining a degree of play between the vehicles because of the mounting described for beam 24.

The beam imparts a thrust to the lead vehicle through rollers 50, 52 journaled on the beam, one adjacent each end of the beam. Each roller is mounted as is described in connection with roller 52, by means of bearings 54 journaling shaft projections 56 extending from the ends of the roller. The rollers are horizontal and extend transversely of the vehicle and with the vehicles coupled together as shown in FIG. 1, are effective to push the lead vehicle forwardly while engaging rear surface portions of the tire casings mounted on the various wheel assemblies.

Projecting out from each end of the beam or arm mounting is a slide 58 having a substantially rectangular cross section. Each slide is slidably mounted on beam 24 in the space between flange 30 and flange 32. A cover plate 59 secured to the front edges of flanges 30, 32, and back plate 26, define an elongated guide way slidably receiving each slide 58.

Joined to the ends of the slides 58, one adjacent each end of beam 24, are arms 60. Each arm projects forwardly and inclines somewhat upwardly progressing from the slide upon which it is mounted. A roller 62 is journaled on the forward end of each arm for rotation about an axis substantially paralleling the longitudinal axis of the beam. Journaled on each arm between the ends thereof is a rotatable sleeve 64. With the two arms on either side of the beam moved toward each other, and with a dump truck between the arms, rollers 62 move into the wheel assemblies of the truck on either side of the truck, and ride on the inside of the annular surfaces presented by the usual rims found in such wheel assemblies. By engaging these annular rim surfaces, the rollers and arms inhibit relative movement of the trailing and lead vehicles away from each other. Sleeves 64 also journaled on the arms, engage the side walls of the outer tire casings in the wheel assemblies, and provide low friction contact with these tire casings.

Power-operated means driven by a motor is provided for producing extension and contraction of the arms. The structure is such that on actuation of the motor that powers the power-operated means to produce extension of the arms, the two arms move an equal amount away from beam 24, and on actuation to produce contraction of the arms into the beam, the arms also move equal amounts inwardly.

More specifically, joined to the slides of the beams are racks 66, 68. The gear teeth of rack 66 face the gear teeth of rack 68. Meshing with the gear teeth of the two racks are the teeth of a pinion gear 74, which is secured to an output shaft 76 of a motor 78, said shaft being journaled in the equalizing beam for rotation about a vertical axis. Motor 78 is a conventional, reversible hydraulic motor, and the supply and exhaust of fluid under pressure is by a pair of conduits such as the conduit 80 illustrated in FIG. 2.

With motor 78 operated so as to rotate pinion gear 74 in a clockwise direction in FIG. 3, the slides for the arms are extended which produces extension of the arms, and on reverse rotation of the pinion gear, the racks move together with movement of the slides inwardly on the equalizing beam and movement of the arms toward each other.

Linking together the frame of the trailing vehicle and the arms on either side of beam 24 are flexible means or chains 82. Each is anchored at 84 to the frame of the paver and at 86 to an adjacent arm. With the arms brought in toward each other so that their rollers 62 are in the position indicated in dashed outline in FIG. 1, the chains are slack so that with the trailing and lead vehicles coupled together lateral shifting of mounting or beam 24 and pivoting of the beam are permitted.

Describing now the operation of the structure described, as already indicated, with the arms brought in toward each other, play between beam 24 and the frame of the paver may take place. Thus relative turning movement of the dump truck with respect to the paver is permitted. The paver may push the dump truck ahead of it by rollers 50, 52 which are journaled on the beam. Separation of the vehicles from each other, such as might result when a load is dumped from the dump truck or when the two vehicles travel over uneven ground, is prevented by rollers 62 engaging the inside annular surfaces in the rims of the wheel assemblies.

On the dump truck dumping its load, and when it is desired to substitute for this truck a filled truck, motor 78 may be actuated to extend the slides and the arms mounted thereon. With partial extension of the arms rollers 62 move outside the wheel assemblies and this frees the dump truck for movement ahead of the paver. In many instances beam 24 will not be exactly transverse of the paver, nor will it be centered relative to yoke 38 and the pivot connection with the frame of the paver. This makes more difficult the job of backing a new truck into proper position for attachment to the paver. Because the arms are linked to the frame of the paver, and because the arms extend equal amounts from opposite ends of the beam upon actuation of the motor, a system is afforded for rapidly and exactly properly positioning the beam, entirely automatically. To further explain, on full extension of the arms and of the slides from the equalizing beam, each projects the same distance from the beam. Further, tension is produced in the chains 82. As a consequence the beam automatically must be shifted to occupy the position illustrated in FIG. 1, which is truly centered relative to the yoke and in a position exactly transverse of the longitudinal axis of the paver. With this condition of the parts, a filled dump truck may be backed into position, and with the arms again contracted, the trailing and lead vehicles become coupled together.

As has been indicated above, the mechanism of this invention may be employed in various types of apparatus. Further, the details of construction may be modified, without departing from the invention. It is desired to cover all modifications and variations as would be apparent to one skilled in the art, and that come within the scope of the appended claims.

It is claimed and desired to secure by Letters Patent:

1. Mechanism for attaching trailing and lead vehicles comprising, and in combination with the frame of the trailing vehicle,
  an elongated arm mounting extending transversely of the forward end of the trailing vehicle,
  means connecting said mounting and the frame of the trailing vehicle permitting relative pivotal movement of the mounting about a substantially vertical axis and shifting of the arm mounting in a direction extending longitudinally thereof and laterally of the trailing vehicle,
  a pair of oppositely disposed arms extending forwardly of said mounting and movably supported on said mounting adjacent its opposite ends, respectively, for movement toward and away from each other,
  means linking each arm and the frame of the trailing vehicle affording limited play of the arm relative to said frame, and
  power-operated means mounted on said mounting for extending said arms from opposite ends of said mounting to the extent afforded by the linking means interconnecting the arms and frame.

2. The mechanism of claim 1, wherein the means connecting the mounting and frame comprises a member pivoted to the frame, and pin and slot means connecting said member and said mounting.

3. Mechanism for attaching trailing and lead vehicles comprising, and in combination with the frame of the trailing vehicle,
  an elongated arm mounting extending transversely of the forward end of the trailing vehicle,
  means interconnecting said arm mounting and the frame of the trailing vehicle accommodating pivotal movement of the mounting about a substantially vertical axis and shifting of the arm mounting in a direction extending longitudinally thereof and laterally of the trailing vehicle,
  a pair of oppositely disposed arms, one adjacent each end of said arm mounting, projecting forwardly from the mounting,
  arm supports connected to each arm supporting the arm on the mounting with the arm movable longitudinally of the mounting,
  said arm supports being constrained from rotation relative to the mounting about the longitudinal axis of the mounting,
  a gear means journaled on the mounting intermediate its ends,
  racks joined to the arm supports with teeth meshing with the teeth of said gear means and operable on rotation of the gear means to produce extension of the arms from opposite ends of the mounting with each arm moving a substantially equal extent relative to the mounting,
  motor means joined to the gear means for rotating it, and
  means operatively linking each arm and the vehicle frame affording a limited amount of play between the two,
  said last-mentioned means producing centering of the arm mounting relative to the vehicle frame and a substantially perpendicular position of the arm mounting relative to the longitudinal axis of the trailing vehicle upon extension of the arms to the limit of the play afforded by said linking means.

4. In combination with a trailing and lead vehicle where said vehicles have frames and the lead vehicle has rear wheels supporting it over the ground, mechanism attaching the two vehicles comprising
  an elongated mounting extending transversely of the forward end of the trailing vechicle,
  antifriction means journaled on said mounting adjacent opposite ends and on forward parts thereof, for engaging the wheels of the lead vehicle, and limiting forward movement of the trailing vehicle relative to the lead vehicle,
  means connecting said mounting and the frame of the trailing vehicle including pivot means accommodating pivotal movement of the mounting about a substantially vertical axis, and side shifting means accommodating shifting of the arm mounting laterally of the trailing evhicle,
  a pair of oppositely disposed arms with one adjacent opposite ends of said mounting, respectively,
  said arms having means mounted adjacent the forward ends thereof adapted to engage the rear wheels of the lead vehicle and by such engagement limit rearward movement of the trailing vehicle relative to the lead vehicle,
  means mounting said arms on said arm mounting, accommodating relative movement of the arms toward and away from each other, and
  power-operated means on said mounting for producing such relative movement in the arms.

5. The vehicle combination of claim 4, which further comprises flexible means interconnecting the arms at each end of said mounting and the frame of the trailing vehicle, affording a limited amount of play of the arm relative to the trailing vehicle.

6. The vehicle combination of claim 5, wherein the means for producing extension and contraction of said arms comprises a rack connected to each arm mounted for movement longitudinally of the mounting, a pinion journaled on the mounting with the teeth thereof engaging the teeth of said racks, and a motor connected to the pinion to rotate the pinion in either of opposite directions.

7. Mechanism for attaching a trailing vehicle through its frame to a lead vehicle, comprising elongated arm mounting means adapted to extend transversely of the longitudinal axis of the trailing vehicle; means adapted to mount said arm mounting means on the frame of such a trailing vehicle, permitting relative pivotal movement of the arm mounting means about a substantially vertical axis, and shifting of the arm mounting means in a direction extending longitudinally thereof and laterally of the trailing vehicle; a pair of oppositely disposed arms extending forwardly of said arm mounting means and movably supported on the arm mounting means adjacent its opposite ends, for movement toward and away from each other; and means adapted operatively to be interposed between said arm mounting means and the frame of such a trailing vehicle for producing centering of the arm mounting means relative to the longitudinal axis of the trailing vehicle frame.

8. The mechanism of claim 7, wherein the means for producing centering comprises means adapted to be connected to the frame of such trailing vehicle, and operatively connected to each arm, for limiting movement of the arm relative to the trailing vehicle frame.

9. Mechanism for attaching a trailing vehicle through its frame to a lead vehicle, comprising elongated arm mounting means adapted to extend transversely of the longitudinal axis of the trailing vehicle; means adapted to mount said arm mounting means on the frame of the trailing vehicle, permitting relative pivotal movement of the arm mounting means about a substantially vertical axis, and shifting of the arm mounting means in a direction extending longitudinally thereof and laterally of the trailing vehicle; antifriction means mounted on said arm mounting means adjacent each of its opposite ends and on forward portions thereof, adapted to engage the wheels of a lead vehicle and by such engagement to limit forward movement of the trailing vehicle relative to the lead vehicle; a pair of oppositely disposed arms, with one adjacent each of the opposite ends of said arm mounting means; and means mounting the arms and the arm mounting means accommodating relative movement of the arms toward and away from each other; said arms having means mounted adjacent their forward ends adapted to engage the rear wheels of a lead vehicle, and by such engagement limit rearward movement of the trailing vehicle relative to the lead vehicle.

References Cited by the Examiner

UNITED STATES PATENTS

| | | | |
|---|---|---|---|
| 2,846,018 | 8/1958 | Puckett | 180—6.2 |
| 3,138,392 | 6/1964 | Holland | 280—460 X |
| 3,172,694 | 3/1965 | Bradley | 294—86 |
| 3,199,910 | 8/1965 | Bradley | 294—86 |

FOREIGN PATENTS 734,062  6/1932  France.

LEO FRIANGLIA, *Primary Examiner.*